No. 788,009. PATENTED APR. 25, 1905.
J. M. WILSON.
BALING PRESS.
APPLICATION FILED APR. 1, 1904.
3 SHEETS—SHEET 1.
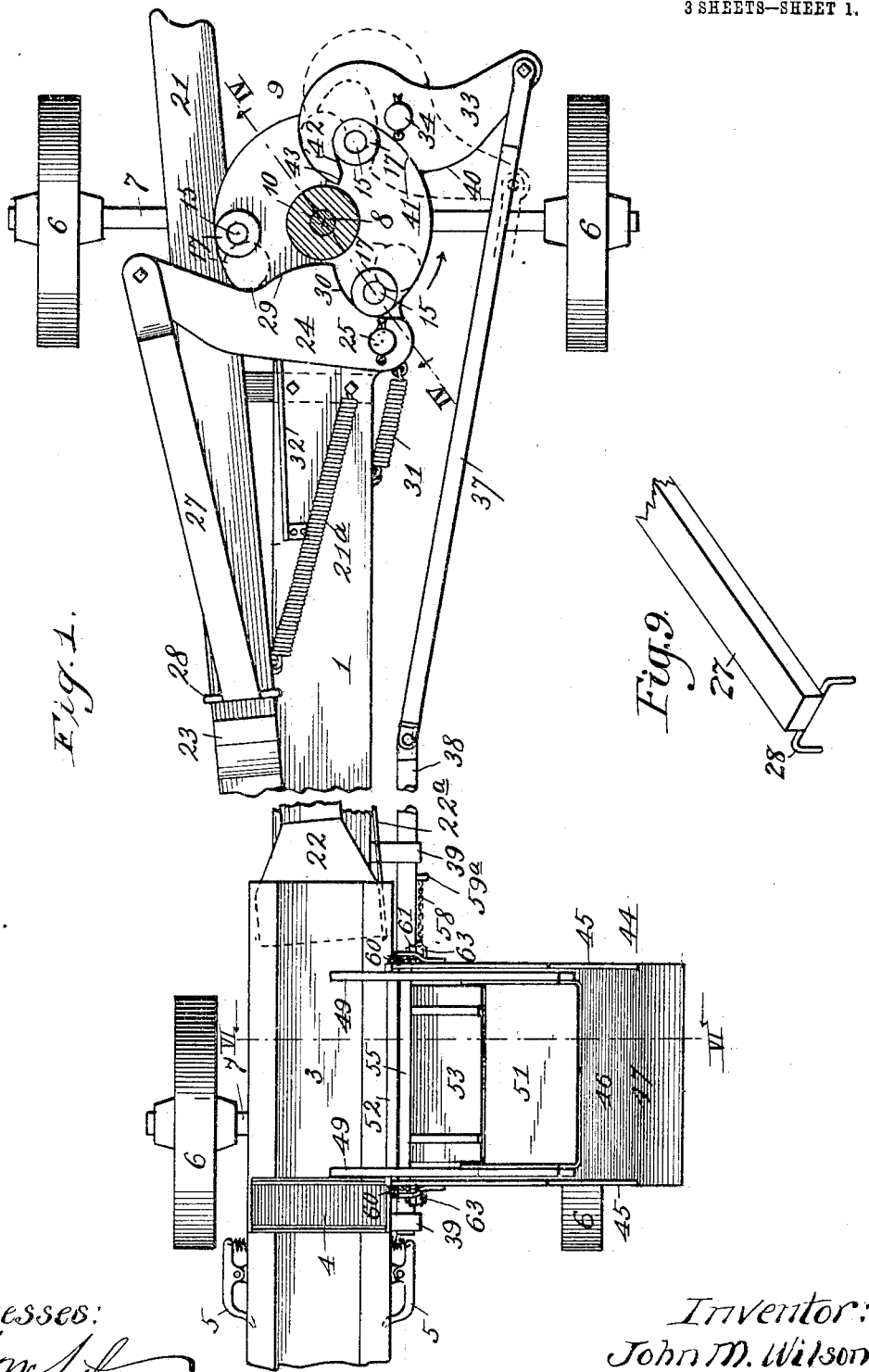
Witnesses:
Inventor:
John M. Wilson
By F. G. Fischer, atty.

No. 788,009. PATENTED APR. 25, 1905.
J. M. WILSON.
BALING PRESS.
APPLICATION FILED APR. 1, 1904.
3 SHEETS—SHEET 2.
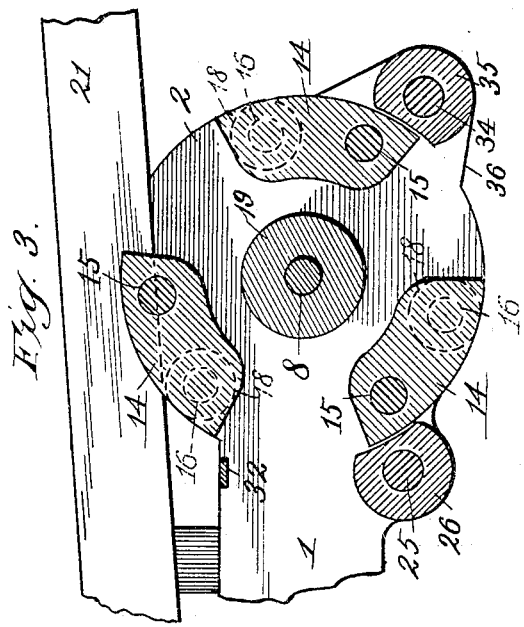
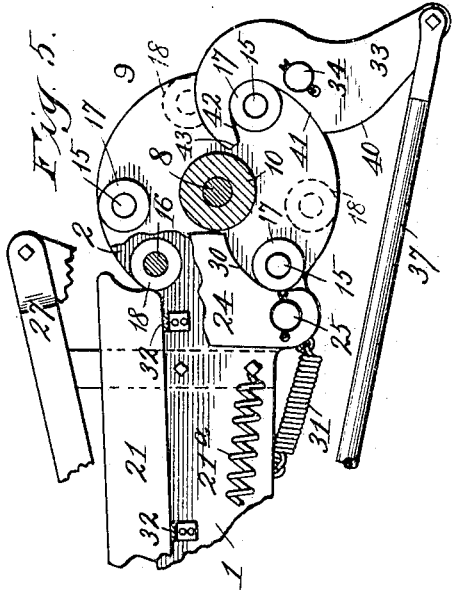
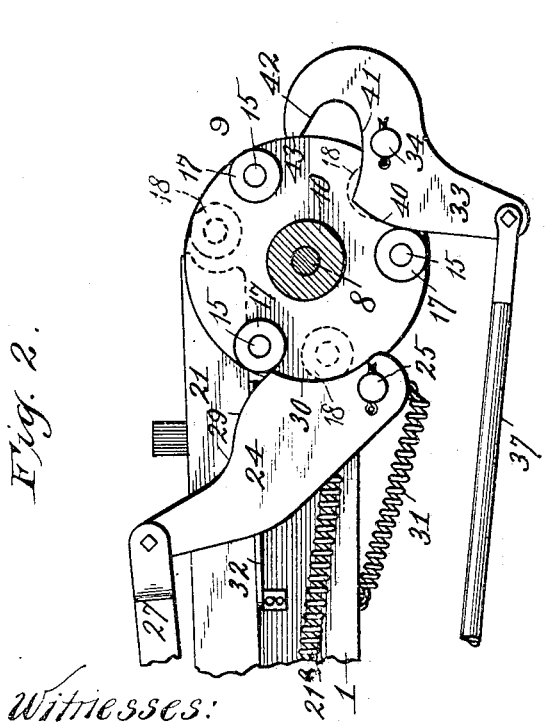
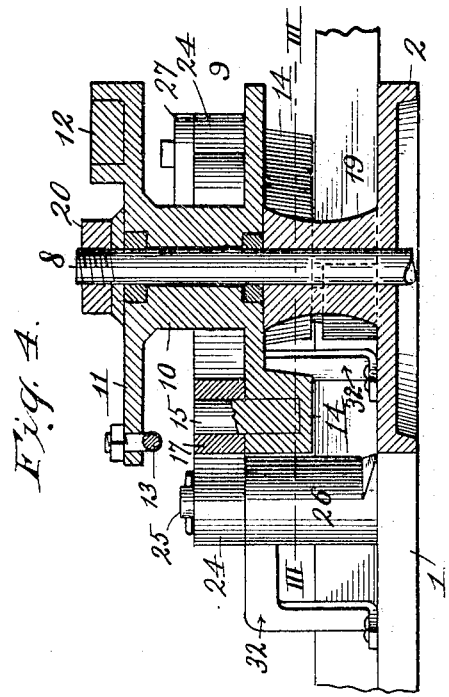
Witnesses:
J. McArthur
J. Moore
Inventor:
John M. Wilson
By F. G. Fischer, atty

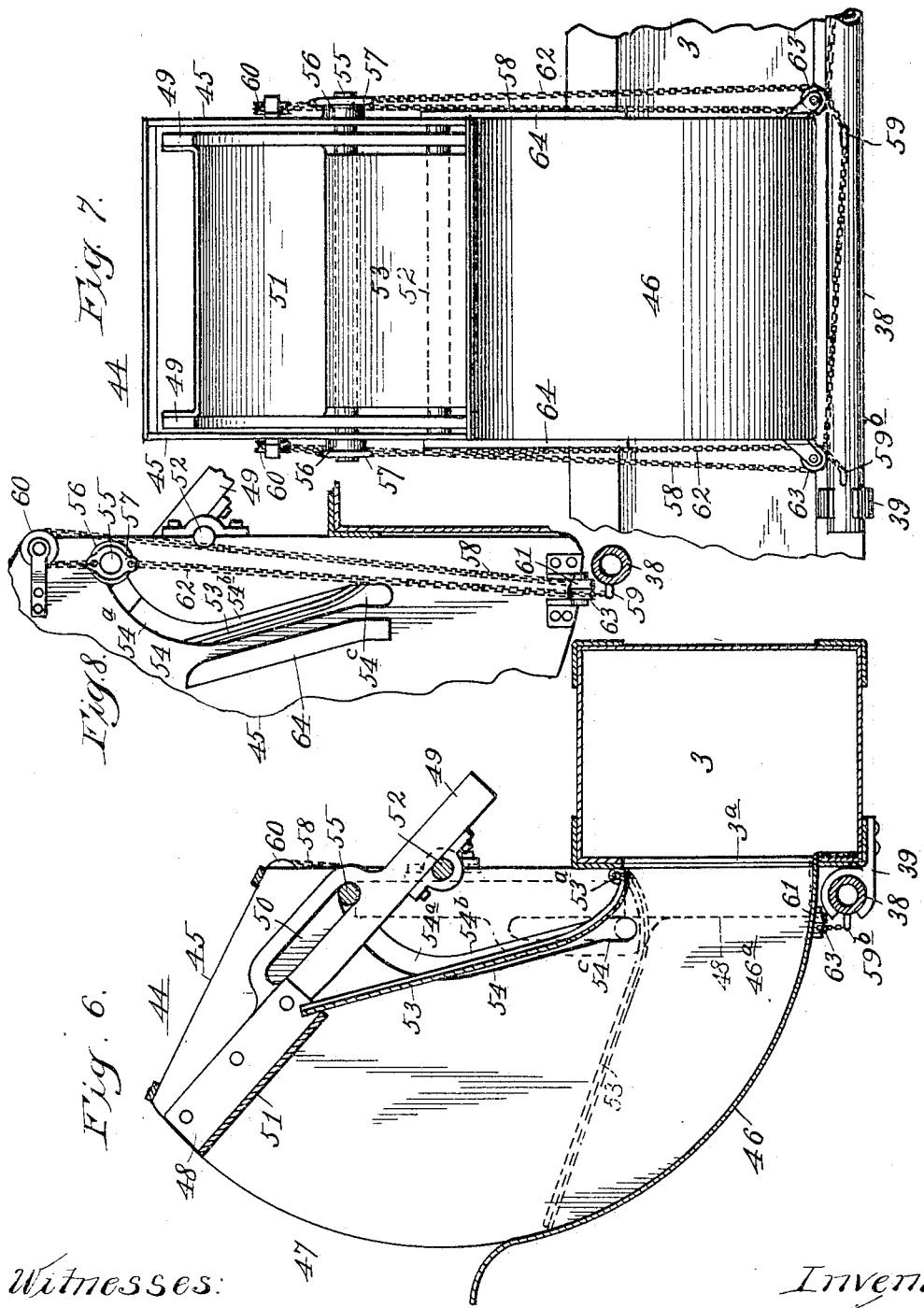

No. 788,009. Patented April 25, 1905.

UNITED STATES PATENT OFFICE.

JOHN M. WILSON, OF KANSAS CITY, MISSOURI.

BALING-PRESS.

SPECIFICATION forming part of Letters Patent No. 788,009, dated April 25, 1905.

Application filed April 1, 1904. Serial No. 201,156.

*To all whom it may concern:*

Be it known that I, JOHN M. WILSON, a citizen of the United States, residing at Kansas City, in the county of Jackson and State of Missouri, have invented certain new and useful Improvements in Baling-Presses, of which the following is a specification.

My invention relates to improvements in baling-presses provided with means for automatically condensing and feeding each charge of hay into the baling-chamber; and it consists in mechanism for accelerating two-thirds of the pitman's forward stroke with the least expenditure of power, a trip-lever for operating said mechanism and completing the forward stroke of the pitman, mechanism for increasing the leverage of the feeder as it condenses each charge, and mechanism connecting the feeder to the trip-lever, so the pitman and the feeder will operate in sequence.

Minor features of the invention will hereinafter appear, and in order that said invention may be fully understood reference will now be made to the accompanying drawings, in which—

Figure 1 is a broken plan view of a baling-press embodying my improvements with the sweep removed and pitman about to start on its forward stroke. Fig. 2 is a horizontal section of the power end of the baling-press taken above the trip-lever, showing the position of the pitman after completing about two-thirds of its forward stroke. Fig. 3 is an enlarged horizontal section of the power end of the baling-press, taken on line III III of Fig. 4. Fig. 4 is a vertical section of the power end of the press, taken on line IV IV of Fig. 1. Fig. 5 is a broken horizontal section of the power end of the press, taken on the same plane as Fig. 2, showing the pitman at the end of its forward stroke. Fig. 6 is a vertical section of the baling-chamber and hopper, taken on line VI VI of Fig. 1, showing the operation of the feeder by dotted lines. Fig. 7 is a front elevation of the hopper and feeder. Fig. 8 is a broken detail side elevation of the hopper, showing part of the mechanism for operating the feeder. Fig. 9 is a broken detail perspective view of an auxiliary pitman forming part of the invention.

In said drawings, 1 designates a bed-plate having a circular forward end 2 and rigidly secured at its rear end to the bottom wall of a baling-chamber 3, provided with an opening 4 in its upper wall for the admission of the usual division-block and provided at its sides with retainers 5. The press is carried on wheels 6, mounted upon axles 7, arranged beneath the circular end of the bed-plate and the baling-chamber.

8 designates a stationary shaft projecting upwardly through the center of circular portion 2 for the reception of a circular trip-lever 9, provided with an upwardly-extending hub 10, journaled on the shaft and formed integral at its upper end with a cross-head 11, provided at its opposite ends with the customary sweep 12 and its brace 13.

14 designates three equally-spaced depending lugs formed integral with the under side of the trip-lever, each of said lugs having an upwardly-extending stub-shaft 15 and a similar downwardly-extending shaft 16, upon which are journaled rollers 17 18, respectively, the latter being arranged slightly in advance of the former, as shown in Fig. 5. The trip-lever is supported upon a pedestal 19, formed integral with the center of circular portion 2, and said trip-lever is removably held in position by a nut 20, engaging the upper threaded end of shaft 8.

21 designates a pitman secured at its forward end to a head-block 22 and provided near its central upper portion with a shoulder 23.

22ª designates a rearwardly-extending apron secured at its forward end to one side of the head-block for the purpose of closing feed-opening 3ª, communicating with one side of the baling-chamber, as the head-block makes its forward stroke.

24 designates a lever of the third class fulcrumed at one end upon a stub-shaft 25, projecting upwardly from a post 26, formed integral with one side of the bed-plate adjacent to the trip-lever. The opposite end of lever 24 is pivotally secured to the rear end of an auxiliary pitman 27, the forward end of which is adapted to contact with shoulder 23 and advance the pitman about two-thirds of its forward stroke. The forward end of the auxiliary pitman is slidingly secured to the main pitman by a depending fork 28, loosely engaging the latter, so that the auxiliary pitman may return to the end of its rearward stroke in advance of the recoil of the main pitman, and thus prevent shoulder 23 from striking the forward end of the auxiliary pitman. Pitman 21 is advanced on its forward stroke by one of rollers 17 contacting with the reverse curve 29, forming part of the rear edge of lever 24, whereby the free end of the latter is swung forward to the position shown in Fig. 2, where it is retained until the roller clears the pivoted end of the lever by curved portion 30, forming part of the rear edge of the latter, said curve being concentric with the center of shaft 8 when the lever occupies the position shown in said figure. When roller 17 has nearly cleared the pivoted end of lever 24, the latter is immediately drawn to the position shown in Fig. 5 by a retractile spring 31, connected at its opposite ends to the pivoted end of the lever and the adjacent side of the bed-plate. Lever 24 is supported in a horizontal position by a U-shaped bracket 32, secured to the upper side of the bed-plate.

33 designates a lever of the first class fulcrumed upon a stub-shaft 34, projecting upwardly from a post 35, formed integral with the upper side of an arm 36, extending forwardly from the circular portion of the bed-plate. Said lever is pivotally connected at its free end to a connecting-bar 37, pivotally secured at its forward end to a rod 38, slidingly arranged in guides 39, secured to the under side of the bed-plate and the baling-chamber. Rod 38 is returned to the end of its backward stroke by one of rollers 17 contacting with the curved edge 40 of lever 33, along which it travels until it contacts with a communicating curve 41, concentric with the center of shaft 8, when the lever has reached the end of its backward stroke, as shown in Fig. 5. The lever is held in this position until the roller contacts with its straight edge 42, along which it travels until it clears the free end 43 of said lever. During the travel of the roller along the straight portion 42 of lever 33 the free end of the latter is moved to the end of its forward stroke, as indicated by dotted lines, Fig. 1, and thus advances rod 38 to the end of its forward stroke. As the fulcrum-point of lever 33 is arranged to one side of the trip-lever, the latter will not become locked from further movement when one of its rollers, 17, engages the hook formed at the juncture of curve 41 with straight edge 42.

44 designates a hopper communicating at its lower end with feed-opening $3^a$ and consisting of sheet-metal sides 45 and a quadrant-shaped bottom 46, extending from the lower portion of feed-opening $3^a$ in the baling-chamber to feed-opening 47 in the upper front portion of the hopper.

48 designates the feeder, consisting of a pair of arms 49, having longitudinal slots 50 and united by a transverse sheet-metal portion 51, which contacts with and forces the charge of hay into the baling-chamber. Arms 49 are pivotally mounted upon a transverse shaft 52, secured to the rear portion of sheet-metal sides 45.

53 designates an apron hinged at $53^a$ to the upper portion of the baling-chamber and resting at its opposite end upon the inner edge of sheet-metal portion 51 in order to direct the charge of hay downwardly toward feed-opening $3^a$.

54 designates a pair of oppositely-disposed slots in sheet-metal sides 45, consisting of segmental portions $54^a$, formed concentric with shaft 52 and communicating with oblique portions $54^b$, communicating at their lower ends with vertical portions $54^c$.

55 designates a transverse shaft extending through slots 50 and 54 and provided at its opposite ends with rollers 56 and links 57.

58 designates a pair of cables attached at their opposite ends to links 57 and staples 59 $59^a$, secured to the side of rod 38 between guides 39. Cables 58 operate over sheave-wheels 60 61 at the upper and lower portions of sheet-metal sides 45.

62 designates a pair of cables attached at their opposite ends to links 57 and staples 59 $59^b$. Said cables operate around sheave-wheels 63, journaled beside sheave-wheel 61.

64 designates tracks secured to the outer surface of sides 45 adjacent to and paralleling the oblique and vertical portions of slots 54 for rollers 56 to travel on, and thus relieve these portions of slots 54 from wear by the contacting shaft 55.

Assuming that the different parts occupy the positions shown in Fig. 1, the operation will be as follows: The rotation of trip-lever 9 will bring one of rollers 17 into contact with the reverse curve 29 and traveling along said edge will swing the free terminal of the lever to the end of its forward stroke, carrying therewith the auxiliary pitman 27, which advances pitman 21 about two-thirds of its stroke, bringing its rear concave end in the path of one of rollers 18, which moves the pitman to the end of its forward stroke. After completing its forward stroke the pitman contacts with bracket 32, which prevents it from following roller 18, so that when the latter passes out of contact therewith the pitman will be retracted by the expansion of the hay in the baling-chamber and retractile spring $21^a$, secured at its opposite ends to the pitman and the bed-plate. Roller 17 clears the fulcrumed end of lever 24 and permits spring 31 to retract the auxiliary pitman before the rebound of pitman 21 occurs in order to prevent shoulder 23 from striking the end of said auxiliary pitman. A charge of hay is forced into the baling-chamber in advance of the plunger by the feeder, which is drawn down to the dotted position shown in Fig. 6 by one of the rollers 17 traveling along the straight edge 42 of lever 33, causing the free end of the latter to swing forward with rods 37 38. The forward movement of rod 38 pulls cables 62 downwardly, together with shaft 55, which latter lowers the feeder. As shaft 55 moves through the concentric portions of slots 54 it will be retained by the latter close to the fulcrumed point of the feeder, and thus accelerate the speed of the same until it begins to condense the charge of hay in the narrow throat 46$^a$ of the hopper preparatory to forcing the charge through the small feed-opening 3$^a$. As the feeder begins to condense the charge it is lent increasing power until lowered to a vertical position by shaft 55 advancing to the forward ends of slots 50, which movement is accomplished by the oblique and vertical portions of slots 54, which increase the distance between the downwardly-moving shaft 55 and the fulcrum of the feeder. While it is condensing and forcing the charge of hay through feed-opening 3$^a$ the strain produced by the tendency of said charge to expand is transferred from the front edges of the oblique and vertical portions of slots 54 to rollers 56 and tracks 64, and after the feeder has been lowered to a vertical position the strain occasioned by the tendency of the charge to expand before the advancing plunger is transferred from cables 62 to rollers 56 and the vertical lower ends of tracks 64. By making said opening 3$^a$ less in height than the baling-chamber, as shown in Fig. 6, a charge of hay when forced into the latter has an opportunity to expand a certain degree, and thus relieve the feeder of undue strain and insure the proper operation of the latter by preventing a portion of the hay from getting caught between the end of the feeder and the lower end of the feed-opening. The feeder is held in a lowered position until the plunger has advanced slightly beyond the feed-opening by roller 17 traveling along the straight edge 42, which is of such length that the roller clears its outer terminal just as the plunger passes the feed-opening. The feeder is then raised almost immediately to receive another charge by the following roller 17 engaging the curved edge 40 of lever 33, swinging the free end of the latter backward with rods 37 38, which latter draws downwardly on cables 58, and thus raises the feeder to the position shown in full lines, Fig. 6, before the plunger completes its backward stroke.

From the above description it is apparent that by giving the charge of hay its initial compression with the feeder in the throat of the hopper before it is forced into the baling-chamber the plunger will not be compelled to compress said charge to the usual extent, and as the feeder condenses the charge before the plunger begins to compress the same it is evident that the work will be more evenly distributed on the team. Furthermore, the work of holding the feeder in a depressed position will be transferred from the team to rollers 46 and the vertical portions of tracks 64.

Having thus described my invention, what I claim, and desire to secure by Letters Patent, is—

1. In a baling-press, a trip-lever rotatably mounted, a lever fulcrumed adjacent to said trip-lever which is swung on its forward stroke thereby, an auxiliary pitman pivotally secured to the free end of the lever, a pitman arranged to receive its forward stroke from the auxiliary pitman and the trip-lever, and means for retracting the first-mentioned lever in advance of the rebound of the pitman.

2. In a baling-press, a trip-lever rotatably mounted, a lever fulcrumed adjacent to said trip-lever which is swung on its forward stroke thereby, a pitman arranged to receive part of its forward stroke from the trip-lever, a shoulder secured to the pitman, an auxiliary pitman pivotally secured at its rear end to the free end of the lever and arranged to engage the shoulder with its forward end, and means for retracting the first-mentioned lever in advance of the rebound of the pitman so the shoulder on the latter will not strike the forward end of the auxiliary pitman.

3. In a baling-press, a lever fulcrumed to the bed-plate of the press, an auxiliary pitman pivotally secured to the lever, a fork depending from the forward end of the auxiliary pitman, a main pitman which is straddled by the fork, a shoulder on said main pitman adapted to be engaged by the front end of the auxiliary pitman, and a journaled trip-lever which advances the first-mentioned lever and engages and advances the main pitman before disengaging said first-mentioned lever.

4. In a baling-press, a vertical shaft, a lever having a reverse curve and a communicating curve which latter is concentric with the vertical shaft when the lever is at the end of its forward stroke, a pitman which is suitably connected to the lever, and a trip-lever mounted upon the shaft which engages the reverse curve and thereby swings the lever to the end of its forward stroke and then engages the concentric curve and holds the lever in its advanced position until said trip-lever engages the end of the pitman.

5. In a baling-press, a trip-lever rotatably mounted, consisting of a circular plate provided with a plurality of equally-spaced lugs, stub-shafts projecting upwardly and downwardly from the lugs and rollers journaled on said stub-shafts, in combination with a lever fulcrumed adjacent to said trip-lever which is swung on its forward stroke by the rollers on top of the trip-lever, an auxiliary pitman pivotally secured to the free end of the swinging lever which is advanced and retracted by the latter, and a pitman arranged to receive its forward stroke from the auxiliary pitman and the rollers at the under side of the trip-lever.

6. In a baling-press, a bed-plate, a trip-lever rotatably mounted upon the bed-plate, a lever fulcrumed adjacent to said trip-lever which is swung on its forward stroke thereby, a bracket secured to the bed-plate to assist in supporting the swinging lever, an auxiliary pitman pivotally secured to the free end of the swinging lever which is advanced and retracted by the latter, and a pitman arranged to receive its forward stroke from the auxiliary pitman and the trip-lever.

7. In a baling-press, a bed-plate, a baling-chamber secured thereon having a feed-opening, a hopper communicating with said opening, a feeder pivotally mounted in the hopper, a lever of the first class suitably connected to the feeder, a trip-lever which operates the lever of the first class, a shaft upon which the trip-lever is journaled, a pedestal formed integral with the bed-plate to support the shaft, a pitman, and a lever of the third class suitably connected to the pitman which is moved on its forward stroke by the trip-lever after the latter moves the lever of the first class on its forward stroke.

8. In a baling-press, a baling-chamber having a feed-opening therein, a hopper communicating with said opening, a feeder pivotally mounted in the hopper, a transverse shaft slidingly secured to the feeder, means for lowering and raising the shaft, and means for causing said shaft to move away from the pivotal point of the feeder while lowering the latter so the same will be lowered with decreasing speed and increasing power.

9. In a baling-press, a baling-chamber having a feed-opening at one side thereof, a hopper communicating with said feed-opening, a feeder pivotally mounted in the hopper, a transverse shaft slidingly secured to the feeder, means for lowering and raising the shaft, and irregular-spaced slots in the sides of the hopper for receiving the opposite ends of the transverse shaft and causing said shaft to move away from the pivotal point of the feeder while lowering the latter so the same will be lowered with decreasing speed and increasing power.

10. In a baling-press, a baling-chamber having a feed-opening therein, a hopper communicating with said feed-opening provided at its opposite sides with irregular-shaped slots comprising segmental upper portions and downwardly-extending communicating oblique portions; a feeder pivotally mounted in the hopper, the axis of the pivot being arranged concentrically with the segmental portions of the slots, a transverse shaft slidingly secured to the feeder and extending through the slots, and means for lowering and raising said shaft.

11. In a baling-press, a baling-chamber having a feed-opening therein, a hopper communicating with said feed-opening and provided with irregular-shaped slots in its opposite sides, tracks secured to said sides and paralleling portions of the slots, a transverse shaft slidingly secured to the feeder and projecting through the slots, rollers mounted on said shaft and adapted to travel on the tracks, and means for lowering and raising the shaft.

12. In a baling-press, a baling-chamber having a feed-opening therein of less height than the baling-chamber, a hopper communicating with said feed-opening having a large feed-opening and a throat reduced to the size of the opening in the baling-chamber, a feeder pivotally mounted in the hopper above the baling-chamber, an apron pivoted in the hopper at the upper edge of the said opening in the baling-chamber and bearing at its upper end against the feeder in order to close the opening between the latter in the top of the baling-chamber, and means for lowering and raising the feeder.

13. In a baling-press, a trip-lever rotatably mounted, a lever fulcrumed adjacent to the trip-lever and provided with a curved edge along which the trip-lever travels and swings it to the end of its backward stroke, a communicating curve extending concentrically with the axes of the trip-lever when the swinging lever is at the end of its backward stroke and against which the trip-lever travels in order to hold the swinging lever at the end of its backward stroke and a communicating straight edge along which the trip-lever travels and advances the swinging lever to the end of its forward stroke; a feeder, and suitable connections between the latter and the swinging lever whereby the feeder is lowered and raised by the backward and forward strokes of the swinging lever.

14. In a baling-press, a trip-lever rotatably mounted, a lever fulcrumed adjacent to the trip-lever which is swung backward and forward by the latter, a rod slidingly mounted in guides secured to the frame of the press, a connecting-rod pivotally secured at its opposite ends to the sliding rod and one end of the swinging lever, and a feeder operatively connected to the sliding rod.

15. In a baling-press, a trip-lever rotatably mounted, a lever fulcrumed adjacent to the trip lever which is swung backward and forward by the latter, a hopper, a feeder pivotally mounted therein, a shaft slidingly secured to the feeder, links secured to the opposite ends of the shaft, a pair of cables operating over sheave-wheels and attached at their upper ends to the lower terminals of the links, and suitable connections between the lower terminals of the cables and one end of the swinging lever.

In testimony whereof I affix my signature in the presence of two witnesses.

JOHN M. WILSON.

Witnesses:
L. E. EMMONS, Jr.,
MARGARET R. KIRBY.